US008948394B2

(12) United States Patent
Chen

(10) Patent No.: US 8,948,394 B2
(45) Date of Patent: Feb. 3, 2015

(54) METHOD AND APPARATUS FOR DISTRIBUTION AND SYNCHRONIZATION OF CRYPTOGRAPHIC CONTEXT INFORMATION

(75) Inventor: Kuang M. Chen, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1301 days.

(21) Appl. No.: 11/680,130

(22) Filed: Feb. 28, 2007

(65) Prior Publication Data

US 2008/0205643 A1 Aug. 28, 2008

(51) Int. Cl.
*H04L 9/00* (2006.01)
*H04L 29/06* (2006.01)
(Continued)

(52) U.S. Cl.
CPC ........... *H04L 63/0428* (2013.01); *H04H 60/23* (2013.01); *H04L 63/062* (2013.01); *H04N 7/1675* (2013.01); *H04N 21/23895* (2013.01); *H04N 21/2541* (2013.01); *H04N 21/25816* (2013.01); *H04N 21/26606* (2013.01); *H04N 21/26613* (2013.01); *H04N 21/64322* (2013.01); *H04H 60/14* (2013.01); *H04L 63/0807* (2013.01); *H04L 2463/062* (2013.01); *H04L 2463/101* (2013.01)
USPC .............. 380/277; 713/168; 713/172; 380/44

(58) Field of Classification Search
CPC ..... H04N 7/167; H04N 7/1675; H04H 60/23; H04H 60/14; H04L 2209/12; H04L 2209/125
USPC ..................... 380/200–205, 277–286, 44–47; 713/168–174, 182–186, 202; 726/2–8; 709/225, 229
See application file for complete search history.

(56) References Cited

U.S. PATENT DOCUMENTS 7,243,366 B2 7/2007 Medvinsky et al.
7,313,238 B2 * 12/2007 Fu et al. ............... 380/277
(Continued)

FOREIGN PATENT DOCUMENTS

WO WO 2006027749 A1 * 3/2006 ............ H04L 9/32

OTHER PUBLICATIONS

J. Postel & J. Reynolds, File Transfer Protocol (FTP), Oct. 1985, Network Working Group, RFC 959.*
(Continued)

*Primary Examiner* — Ashok Patel
*Assistant Examiner* — Daniel Potratz
(74) *Attorney, Agent, or Firm* — Fox Rothschild LLP

(57) ABSTRACT

Method and apparatus for distribution and synchronization of cryptographic context information is described. An aspect of the invention relates to synchronizing an encryptor and key management logic in a video distribution system. A request message is received from the encryptor. The request message includes authentication data and stream-dependent parameters associated with an internet protocol (IP) packet stream to be encrypted. Authenticity of the encryptor is verified using the authentication data. A cryptographic context for the IP packet stream is generated having the stream-dependent parameters and at least one encryption key. A reply message is sent to the encryptor having the at least one encryption key. Key stream messages having the cryptographic context are distributed towards user devices. The user devices are receiving an encrypted version of the IP packet stream generated by the encryptor.

17 Claims, 5 Drawing Sheets

(51) Int. Cl.
*H04H 60/23* (2008.01)
*H04N 7/167* (2011.01)
*H04N 21/2389* (2011.01)
*H04N 21/254* (2011.01)
*H04N 21/258* (2011.01)
*H04N 21/266* (2011.01)
*H04N 21/643* (2011.01)
*H04L 9/32* (2006.01)
*H04H 60/14* (2008.01)

(56) References Cited

U.S. PATENT DOCUMENTS

| | | | |
|---|---|---|---|
| 7,568,111 B2* | 7/2009 | Alve et al. | 713/189 |
| 7,620,187 B1* | 11/2009 | Didier et al. | 380/279 |
| 7,623,662 B2* | 11/2009 | Pedlow et al. | 380/211 |
| 2002/0044658 A1* | 4/2002 | Wasilewski et al. | 380/239 |
| 2003/0140257 A1 | 7/2003 | Peterka et al. | |
| 2004/0168063 A1* | 8/2004 | Revital et al. | 713/172 |
| 2005/0254656 A1* | 11/2005 | Rose et al. | 380/277 |
| 2007/0162981 A1* | 7/2007 | Morioka et al. | 726/30 |
| 2007/0206787 A1* | 9/2007 | Bell | 380/30 |
| 2007/0265966 A1* | 11/2007 | Kahn et al. | 705/51 |
| 2009/0028331 A1* | 1/2009 | Millar et al. | 380/255 |

OTHER PUBLICATIONS

Bird, R. et al, "The KryptoKnight Family of Light-Weight Protocols for Authentication and Key Distribution", Feb. 1995, IEEE/ACM Transactions on Networking, vol. 3, No. 1, pp. 31-41.*

Baugher, M. et al, "The Secure Real-time Transport Protocol (SRTP)", Mar. 2004, Network Working Group, RFC 3711.*

"IP Datacast over DVB-H: Service Purchase and Protection (SPP)", Dec. 2005, Digital Video Broadcasting, DVB Document A100, pp. 1-278.*

Digital Video Broadcasting: "IP Datacast over DVB-H: Architecture", Internet citation, Nov. 2005, Retrieved from the Internet: http://www.dvb-h-online.org/PDF/a098.tm3347r2.cbms1168r15.IPDC_Architecture.pdf.

* cited by examiner

METHOD AND APPARATUS FOR DISTRIBUTION AND SYNCHRONIZATION OF CRYPTOGRAPHIC CONTEXT INFORMATION

BACKGROUND OF THE INVENTION

1. Field of the Invention

The present invention relates to systems and methods for secure distribution of content and, more particularly, to a method and apparatus for distribution and synchronization of cryptographic context information in a video distribution system.

2. Description of the Background Art

Presently, programming providers desire the ability to deliver digital content to handheld mobile devices, such as cellular telephone, personal digital assistants (PDAs), and the like, in an effective manner. One standard for distributing digital content to handheld devices is the Digital Video Broadcasting (DVB) transmission system for handheld terminals (DVB-H), published by the European Telecommunications Standards Institute (ETSI). The DVB-H system is based on the terrestrial DVB system (DVB-T) for fixed reception of digital content. The DVB-H system is an end-to-end broadcast system for delivery of any type of digital content using Internet Protocol (IP)-based mechanisms optimized for devices with limitations on computational resources and battery (e.g., handheld mobile devices).

The DVB-H standard provides for digital rights management (DRM), which are a set of methods that ensures that a user device can only use particular content when relevant conditions (e.g., access conditions) have been met. Content is encrypted by a symmetric encryption algorithm using a key. Entitlement control messages (ECMs) are generated to securely transmit cryptographic context data to the devices. The cryptographic context data includes the keys used to encrypt the media stream, as well as other information necessary to decrypt and recover the content at the devices. The DVB-H standard, however, does not define an implementation for generating and distributing the ECMs. In particular, the DVB-H standard does not define how the functional unit that generates the ECMs obtains the cryptographic context data. The DVB-H standard also does not define how to synchronize the cryptographic context data with the encrypted content.

Accordingly, there exists a need in the art for a method and apparatus for distribution and synchronization of cryptographic context information in a DVB-H system.

SUMMARY OF THE INVENTION

Method and apparatus for distribution and synchronization of cryptographic context information is described. An aspect of the invention relates to synchronizing an encryptor and key management logic in a video distribution system. A request message is received from the encryptor. The request message includes authentication data and stream-dependent parameters associated with an internet protocol (IP) packet stream to be encrypted. Authenticity of the encryptor is verified using the authentication data. A cryptographic context for the IP packet stream is generated having the stream-dependent parameters and at least one encryption key. A reply message is sent to the encryptor having the at least one encryption key. Key stream messages having the cryptographic context are distributed towards user devices. The user devices are receiving an encrypted version of the IP packet stream generated by the encryptor.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
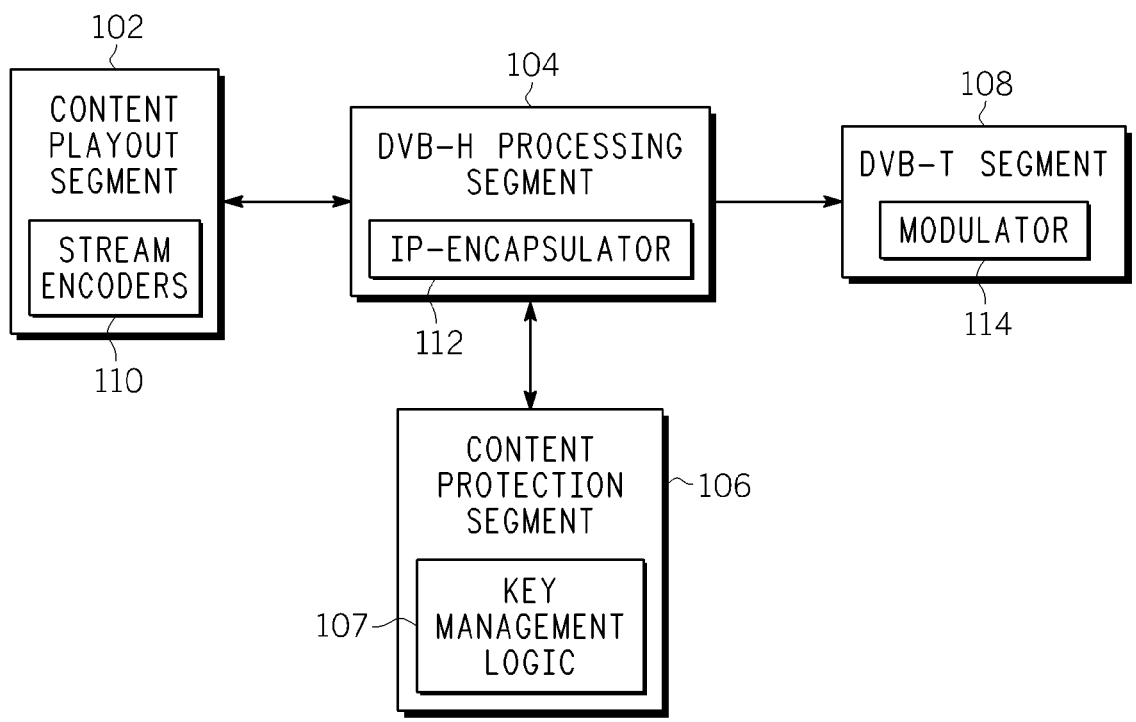
FIG. 1 is a block diagram depicting an exemplary embodiment of a content distribution system in accordance with one or more aspects of the invention.

FIG. 1 is a block diagram depicting an exemplary embodiment of a content distribution system 100 in accordance with one or more aspects of the invention. The content distribution system 100 includes a content playout segment 102, a digital video broadcasting handheld (DVB-H) processing segment 104, a content protection segment 106, and a DVB terrestrial (DVB-T) segment 108. The content playout segment 102 is configured to receive content streams. The content streams may comprise video streams encoded and formatted in accordance with any well-known digital video compression standard, such as MPEG-2 (Moving Pictures Experts Group), H.264 (also known as advanced video coding (AVC) and MPEG-4, part 10), and the like. Video, as used herein, may optionally include audio and/or associated audio/video presentation control information and/or user data.

The content playout segment 102 includes a plurality of stream encoders 110. The stream encoders 110 are configured to convert the content streams into internet protocol (IP) packet streams. The content playout segment 102 provides the IP packet streams to the DVB-H processing segment 104. The DVB-H processing segment 104 includes IP-encapsulators 112, which operate in cooperation with the content protection segment 106. The content protection segment 106 is configured to encrypt the IP packet streams and provide streams for carrying encryption keys, entitlements, access rights, and the like. The content protection segment 106 includes key management logic 107 for securely generating, managing, and distributing encryption keys. The IP-encapsulators 112 are configured to create DVB-H transport streams from the encrypted IP packet streams and the streams presented by the content protection segment 106. As is known in the art, the DVB-H transport streams include MPEG-2 transport stream packets that encapsulate IP packets. The details of DVB-H IP encapsulation are well known in the art and can be found in the European Telecommunications Standards Institute (ETSI) specification EN 302 304 "Digital Video Broadcasting (DVB); Transmission System for Handheld Terminals (DVB-H)," V1.1.1, November 2004.

The DVB-H transport streams are provided to the DVB-T segment 108 (DVB terrestrial). The DVB-T segment 108 includes a modulator 114. The modulator 114 is configured to modulate the DVB-H transport streams for transmission to user devices 118. The user devices 118 are configured to receive DVB-T signals, parse DVB-H transport streams, and decrypt and render the IP packet streams for display of content to a user. The details of DVB-T modulation and transmission are well known in the art and can be found in the ETSI specification EN 300 744 "Digital Video Broadcasting (DVB); Framing structure, channel coding and modulation for digital terrestrial television," V.1.5.1, November 2004.

Figure 2:
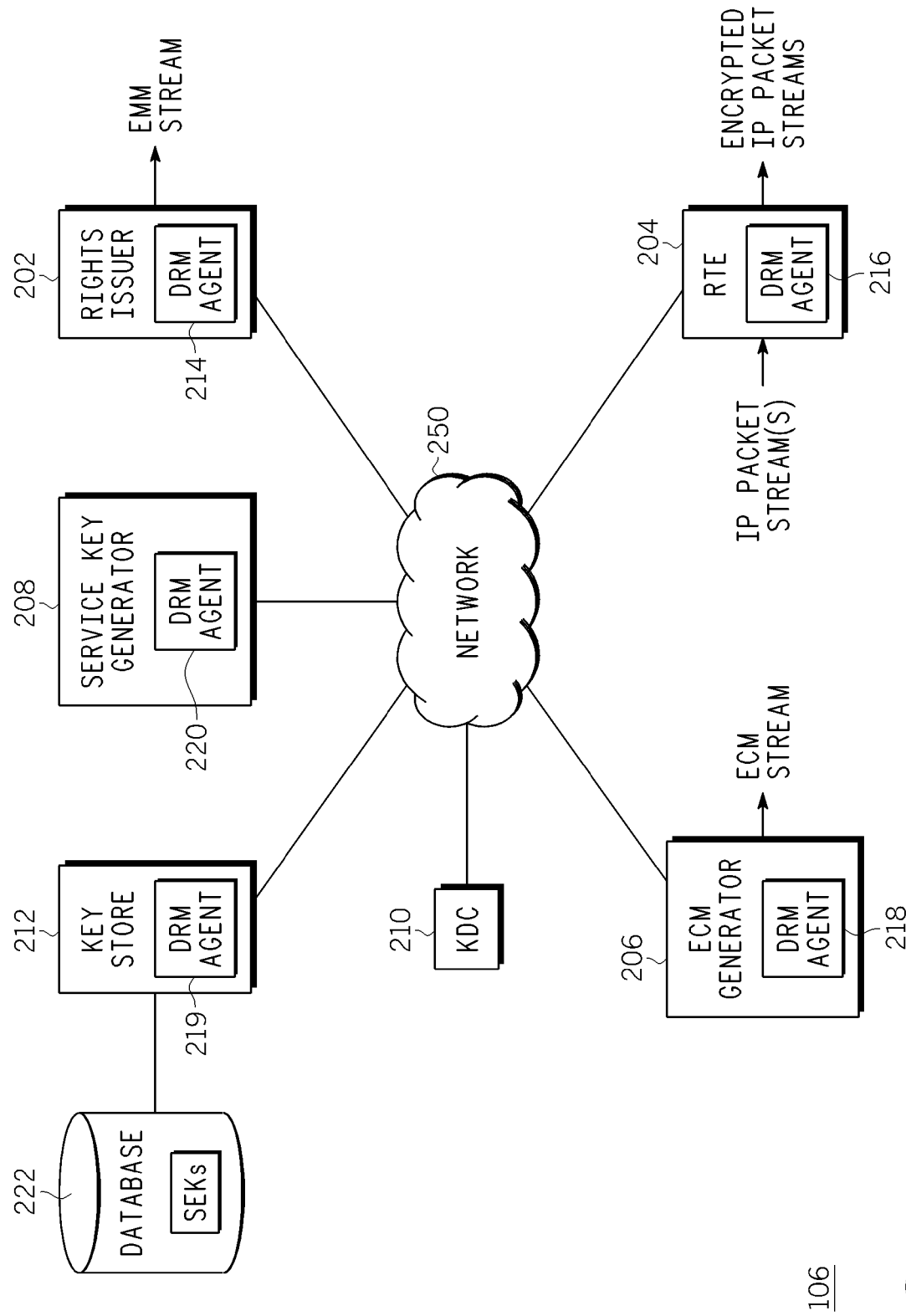
FIG. 2 is a block diagram depicting an exemplary embodiment of the content protection system in accordance with one or more aspects of the invention.

FIG. 2 is a block diagram depicting an exemplary embodiment of the content protection system 106 in accordance with one or more aspects of the invention. The content protection system 106 includes a rights issuer 202, a real-time encryptor (RTE) 204, an entitlement control message (ECM) generator 206, a service key generator 208, a key distribution center (KDC) 210, and a key store 212. The rights issuer 202, the RTE 204, the ECM generator 206, the key store 212, and the service key generator 208 include digital rights management (DRM) agents 214, 216, 218, 219, and 220, respectively. The DRM agents 214 through 220 collectively implement the key management logic 107 of the content protection system 106. The rights issuer 202, the RTE 204, the ECM generator 206, the service key generator 208, the KDC 210, and the key store 212 are each coupled to a network 250 (e.g., an IP network) for communication therebetween. For purposes of clarity by example, only a single RTE 204, single ECM generator 206, single service key generator 208, single KDC, and single key store 212 is shown. It is to be understood that the content protection system 106 generally may include at least one of each of the components. For example, the content protection system 106 includes a plurality of RTEs for encrypting a respective plurality of IP streams.

The RTE 204 is configured to receive at least one IP packet stream. The RTE 204 encrypts each IP packet stream using a symmetric encryption algorithm, such as the advanced encryption standard (AES) algorithm, the triple data encryption standard (3DES) algorithm, or the like. The key used to encrypt an IP packet stream is referred to herein as the traffic encryption key (TEK). The TEK may be used to directly encrypt the IP packet stream (i.e., the TEK is directly applied by the encryption algorithm). Alternatively, the TEK may be a master key from which one or more keys are derived, such key(s) being used to encrypt the IP packet stream. Key(s) may be derived from the TEK in a cryptographically secure manner using a key derivation function. The encryption may be performed at the link layer, the session layer, or the content layer. In one embodiment, the encryption is performed at the session layer in accordance with the secure real-time transport protocol (SRTP), as described below.

The RTE 204 obtains the TEK from the ECM generator 206. In one embodiment, the RTE 204 establishes a secure session with the ECM generator 206. During the secure session, the RTE 204 and the ECM generator 206 are mutually authenticated and messages exchanged therebetween may be secured. As used herein, "authentication" is the cryptographic verification of the identities of the communicating elements. "Security" is the cryptographic protection (encryption) applied to the information exchanged between the communicating elements. Establishment of the secure session is facilitated by the DRM agents 216 and 218 of the RTE 204 and the ECM generator 206, respectively. Exemplary embodiments for implementing secure sessions are described below.

To obtain a TEK, the RTE 204 sends a key request message to the ECM generator 206. The RTE 204 receives a key reply message from the ECM generator 206. The key reply message includes at least a TEK for the IP packet stream to be encrypted. In one embodiment, a TEK is configured to expire. Upon expiration of each TEK, the RTE 204 sends another key request message and receives another key reply message having a valid TEK. The RTE 204 outputs encrypted IP packet stream(s).

The ECM generator 206 is configured to process key request messages from the RTE 204. For a given key request message, the ECM generator 206 generates a cryptographic context that includes at least a TEK for the IP packet stream to be encrypted. The cryptographic context includes various other parameters that are required at the user device to decrypt the encrypted IP packet stream. Such parameters depend on the particular protocol employed by the RTE 204. Some or all of these parameters may depend on the particular IP packet stream being encrypted ("stream-dependent parameters"). Exemplary stream-dependent parameters for SRTP are described below. The RTE 204 provides the stream-dependent parameters to the ECM generator 206 in the key request message. In this manner, the cryptographic context is synchronized with the IP packet stream to be encrypted. An exemplary cryptographic context for SRTP is described below.

The ECM generator 206 transmits the TEK to the RTE 204 in the key reply message. The ECM generator 206 is also configured to form key stream messages (ECMs) for use by user terminals to reconstruct TEKs needed to decrypt content in the encrypted IP packet streams. For each encrypted IP packet stream output by the RTE 204, the ECM generator 206 generates a sequence of ECMs each having the associated cryptographic context. At least the portion of each ECM that carries a TEK is encrypted using a symmetric encryption algorithm, such as the AES, 3DES, or like algorithm. The key used in the algorithm to encrypt the TEK is referred to as the service encryption key (SEK).

The ECM generator 206 obtains the SEK from the key store 212. In one embodiment, the ECM generator 206 establishes a secure session with the key store 212. The ECM generator 206 and the key store 212 are mutually authenticated and messages exchanged therebetween can be secured. Establishment of the secure session is facilitated by the DRM agents 218 and 219 of the ECM generator 206 and the key store 212, respectively. To obtain an SEK, the ECM generator 206 sends a key request message to the key store 212. The ECM generator 206 receives a key reply message from the key store 212 that includes an SEK or information from which the SEK can be derived (referred to as a service subkey). In one embodiment, an SEK (or service subkey) is configured to expire. Upon expiration of each SEK (or service subkey), the ECM generator 206 sends another key request message and receives another key reply message having a fresh SEK (or service subkey). The ECM generator 206 outputs an ECM stream.

The rights issuer 202 is configured to form entitlement management messages (EMMs). The EMMs include content access rights for use by user terminals access particular content streams. EMMs are typically exchanged as a result of a purchase transaction or subscription by a user terminal. The content access rights include at least a SEK used to access ECMs for an IP packet stream. The content access rights may also include entitlements and rights associated with the content carried by the IP packet stream. The entitlements and rights control playback, transfer, copying, and the like for the content. At least the portion of each EMM that carries an SEK is encrypted. The user terminal or terminals receiving the EMMs are provisioned with or have otherwise obtained the key necessary for decrypting the SEK. For example, the SEK may be encrypted using an asymmetric (public key) encryption algorithm, such as RSA, elliptic curve cryptography (ECC), and the like.

The rights issuer 202 obtains SEKs from the key store 212. In one embodiment, the rights issuer 202 establishes a secure session with the key store 212. The rights issuer 202 and the key store 212 are mutually authenticated and messages exchanged therebetween can be secured. Establishment of the secure session is facilitated by the DRM agents 214 and 219 of the rights issuer 202 and the key store 212, respectively. To obtain an SEK, the rights issuer 202 sends a key request message to the key store 212. The rights issuer 202 receives a key reply message from the key store 212 that includes an SEK or information from which the SEK can be derived. If the SEK (or service subkey) is configured to expire, upon expiration of each SEK (or service subkey), the rights issuer 202 sends another key request message and receives another key reply message having a valid SEK (or service subkey). The rights issuer 202 outputs an EMM stream.

The service key generator 208 is configured to initiate the generation of SEKs. In one embodiment, the service key generator 208 establishes a secure session with the key store 212. The service key generator 208 and the key store 212 are mutually authenticated and messages exchanged therebetween can be secured. Establishment of the secure session is facilitated by the DRM agents 220 and 219 of the service key generator 208 and the key store 212, respectively. To generate an SEK, the service key generator 208 sends a key generation request message to the key store 212. The service key generator 208 receives a key reply message from the key store 212 that includes an SEK or information from which the SEK can be derived. The service key generator 208 may configure the SEK (or service subkey) to expire. In this case, the service key generator 208 repeats the key generation request to generate a valid SEK (or service subkey).

The key store 212 is configured to process key request messages, such as key request messages for SEKs from the ECM generator 206 and the rights issuer 202. The key store 212 is also configured to process key generation request messages from the service key generator 208. In response to a key generation request message, the key store 212 randomly generates an SEK. Alternatively, the key store 212 may randomly generate a service subkey that can be used to derive an SEK. The service subkey is used as input to a key derivation function, which produces the SEK. The elements receiving the service subkey (e.g., the ECM generator 206 and the rights issuer 202) are provisioned with or have otherwise obtained the key derivation function. The key derivation function may a cryptographic hash function or combination of such hash functions, where the subkey comprises at least a portion of message(s) input to the hash function(s). In either case, the key store 212 stores SEKs (or service subkeys) in a database 222. In response to a key request message, the key store 212 transmits the requested SEK (or service subkey) in a key reply to the requesting element.

As described above, secure sessions are established between the RTE 204 and the ECM generator 206, between the ECM generator 206 and the key store 212, between the rights issuer 202 and the key store 212, and between the service key generator 208 and the key store 212. The secure sessions are established via the request/reply exchanges. In general, the request/reply exchange is a client/server exchange, where the requester is the client and the replier is the server. In one embodiment, before a server provides a requested key to a client, the DRM agents of the client and the server perform mutual authentication. That is, the server authenticates the client, and the client authenticates the server. Authentication may be performed using any type of known authentication technique. For example, authentication may be achieved using a public key infrastructure (PKI). A message or hash generated by the client is digitally signed by the client using the client's private key. The server verifies authenticity of the client using the client's public key. The server may obtain the client's public key from a digital certificate received from the client or otherwise obtained. The PKI is well known in the art.

In another embodiment, authentication in a secure session is achieved using authentication tokens obtained from the KDC 210. Before a client can be authenticated by a particular server, the DRM agent of the client must obtain an authentication token from the KDC 210 for that server. Thus, the DRM agent 216 of the RTE 204 obtains an authentication token for the ECM generator 206. The DRM agent 218 of the ECM generator, the DRM agent 220 of the service key generator 208, and the DRM agent 214 of the rights issuer 202 each obtain an authentication token for the key store 212. The authentication token includes information that can be used to verify mutual authenticity between a client and a server. In one embodiment, an authentication token includes a session key that is encrypted using a key known only to the KDC 210 and the server (referred to as a service key). The KDC 210 returns a copy of the session key to the DRM agent of the client along with the authentication token.

Having obtained the authentication token and the related session key, the DRM agent of the client is able to establish a secure session with the DRM agent of the server. The client authenticates itself to the server by sending the server the authentication token and a keyed hash generated using the session key (also referred to as a checksum value). The keyed hash is the client's proof of possession of the session key. The server in turn authenticates itself with a keyed hash generated from that same session key. The server must posses its service key in order to decrypt and extract the session key from the authentication token. The keyed hash is thus the server's proof of possession of its service key. In this manner, the client and server are mutually authenticated. The client may send the authentication token and the keyed checksum value to the server in the key request message. The server may send its keyed checksum value to the client in the key reply message.

In one embodiment, the clients must establish a secure session with the KDC 210 to obtain the authentication tokens and session keys. The DRM of the client may establish a secure session with the KDC 210 using a PKI infrastructure or other type of public key operation, such as ECC. Alternatively, the DRM of the client may have been provisioned with or otherwise obtained an authentication token associated with the KDC 210.

Regardless of the authentication technique employed, in some embodiments, the at least some information transferred between client and server during a secure session is encrypted. At least a portion of the key request message, and at least a portion of the key reply message, may be encrypted using the session key or other negotiated key or keys. Key(s) may be negotiated using any key agreement algorithm known in the art, such as Diffie-Hellman or Elliptic Curve Diffie-Hellman (ECDH). For example, during a secure session between the RTE 204 and the ECM generator, the TEK within a key replay message is encrypted. In another example, during secure sessions with the key store 212, the SEK (or service subkey) within a key reply message is encrypted. Of course, any information exchanged between client and server during a secure session may be encrypted, including information provided as part of the key request messages from clients.

The encrypted IP packet streams, the ECM stream, and the EMM stream may be provided to the DVB-H processing segment 104 to produce the DVB-H transport streams. The ECM and EMM streams provide for distribution of cryptographic context information to the user devices 118. Notably, a cryptographic context is synchronized with its encrypted IP packet stream through the establishment of a secure session between the RTE 204 and the ECM generator 206. Through the secure session, the RTE 204 provides stream-dependent parameters associated with an IP packet stream to be encrypted to the ECM generator 206. The ECM generator 206 uses the stream-dependent parameters to establish a cryptographic context, which includes a TEK. The ECM generator provides at least the TEK to the RTE 204 for encrypting the IP packet stream. The ECM generator 206 distributes the cryptographic context in the ECM stream.

Figure 3:
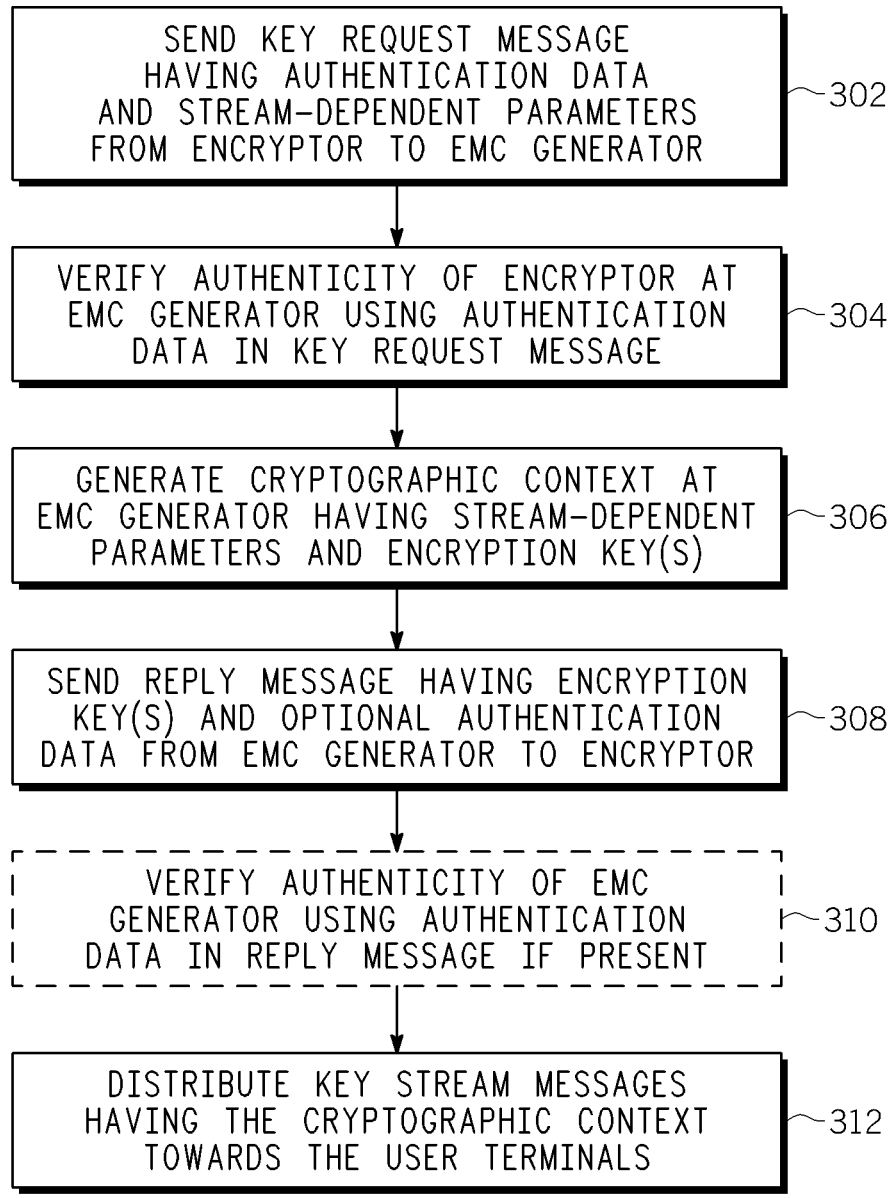
FIG. 3 is a flow diagram depicting an exemplary embodiment of a method for synchronizing a cryptographic context with an IP packet stream to be encrypted in accordance with one or more aspects of the invention.

FIG. 3 is a flow diagram depicting an exemplary embodiment of a method 300 for synchronizing a cryptographic context with an IP packet stream to be encrypted in accordance with one or more aspects of the invention. The method 300 begins at step 302, where the encryptor sends a key request message to the ECM generator. The key request message includes authentication data and stream-dependent parameters associated with an IP packet stream to be encrypted. At step 304, the ECM generator verifies the authenticity of the encryptor using the authentication data. Embodiments of authentication are described above. At step 306, the ECM generator generates a cryptographic context for the IP packet stream having the stream-dependent parameters and at least one encryption key. At step 308, the ECM generator sends a reply message to the encryptor. The reply message includes the generated encryption key(s) and may optionally include authentication data. At optional step 310, the encryptor verifies the authenticity of the ECM generator using the authentication data in the reply message (if included). At step 312, the ECM generator distributes key stream messages having the cryptographic context towards the user devices. The encryptor may then encrypt the IP packet stream using the encryption key(s) for distribution to user devices.

Figure 4:
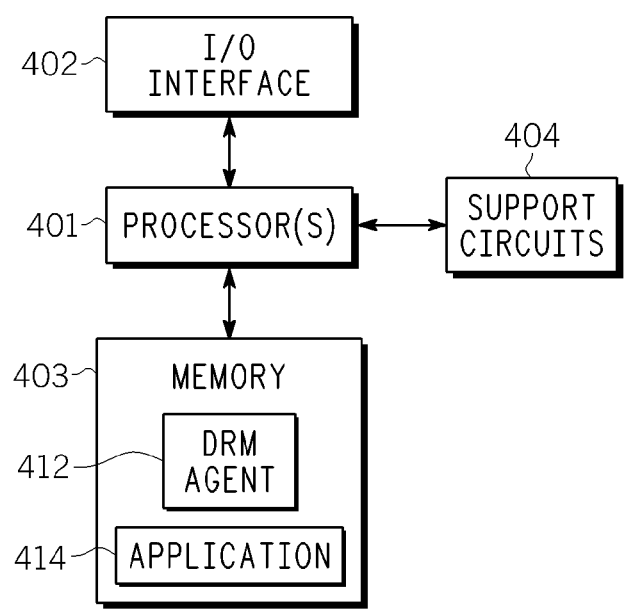
FIG. 4 is a block diagram depicting an exemplary embodiment of a computer for implementing the processes and methods described herein in accordance with one or more aspects of the invention.

FIG. 4 is a block diagram depicting an exemplary embodiment of a computer 400 in accordance with one or more aspects of the invention. The computer 400 any of the elements in the content protection segment 106, including the RTE 204, the ECM generator 206, the service key generator 208, the rights issuer 202, the key store 212, and the KDC 210. Although such elements are shown separately in FIG. 2, those skilled in the art will appreciate that one or more of such elements may be implemented as modules within a single computer. For example, the key store 212 and the KDC 210 may be implemented on the same computer. The service key generator 208 may be implemented with the key store 212 on the same computer.

The computer 400 includes one or more processors 401, a memory 403, various support circuits 404, and an I/O interface 402. The processor(s) 401 may be any type of microprocessor known in the art. The support circuits 404 for the processor(s) 401 include conventional cache, power supplies, clock circuits, data registers, I/O interfaces, and the like. The I/O interface 242 may be directly coupled to the memory 403 or coupled through the processor(s) 401. The I/O interface 402 may be coupled to the network 250. The memory 403 may include one or more of the following random access memory, read only memory, magneto-resistive read/write memory, optical read/write memory, cache memory, magnetic read/write memory, and the like, as well as signal-bearing media as described below.

The memory 403 stores processor-executable instructions and/or data that may be executed by and/or used by the processor(s) 401 as described further below. These processor-executable instructions may comprise hardware, firmware, software, and the like, or some combination thereof. Modules having processor-executable instructions that are stored in the memory 403 include DRM agent 412 and application 414. The DRM agent 412 is configured to function as the DRM agents 214-220 described above. In particular, the DRM agent 412 is configured to establish secure sessions for mutual authentication and the secure transfer of messages, including encryption keys. The DRM agent 412 may also be configured to manage encryption keys, as described in the embodiments below. The application 414 dictates the function of the computer 400, e.g., real-time encryption, ECM generation, rights issuer, service key generation, key storage, and/or key distribution.

Although one or more aspects of the invention are disclosed as being implemented as processor(s) executing a software program, those skilled in the art will appreciate that the invention may be implemented in hardware, software that is executed on one or more processors, or a combination of hardware and software. Such implementations may include a number of processors independently executing various programs and dedicated hardware, such as ASICs. The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403.

Returning to FIG. 2, in one embodiment, the IP packet stream(s) are formatted at the session layer according to the real-time transport protocol (RTP) ("RTP streams"). RTP is described in Request for Comments (RFC) 3550, published July 2003 by the Internet Engineering Task Force (IETF). The encrypted IP packet streams produced by the RTE 204 are formatted at the session layer according to the secure real-time transport protocol (SRTP) ("SRTP streams"). SRTP is described in RFC 3711, published March 2004 by the IETF, which is incorporated by reference herein.

To further understand the invention, aspects of SRTP are briefly described. Each SRTP packet includes, among other parameters, a sequence number, a synchronization source (SSRC) identifier, and a payload. Each SRTP packet may optionally include a master key identifier (MKI) and an authentication tag. The SRTP payload includes an encryption of an RTP payload. The sequence number of the SRTP packet is the same as the underlying RTP packet. Each RTP packet includes a sequence number comprising 16-bits. The sequence number increments by one for each RTP packet sent. The SSRC identifies a synchronization source of RTP packets that form part of the same timing and sequence number space. An authentication tag is used to carry message authentication data for an SRTP packet. The MKI identifies a master key from which session key(s) are derived to encrypt the RTP packets. In SRTP, a session key is a key used directly by an encryption algorithm. A master key is a random bit string from which session keys are derived in a cryptographically secure manner (e.g., using a key derivation function). An SRTP stream requires the sender and receiver to maintain a cryptographic context. An SRTP cryptographic context includes, among other parameters, a rollover counter (ROC), a sequence number, master key(s), an MKI value, a master key lifetime, and a context identifier (context ID). The ROC records how many times the 16-bit sequence number has been reset to zero after passing through 65,535. The context ID unique identifies the cryptographic context and comprises a triplet of SSRC, destination network address, and destination transport port number.

Figure 5:
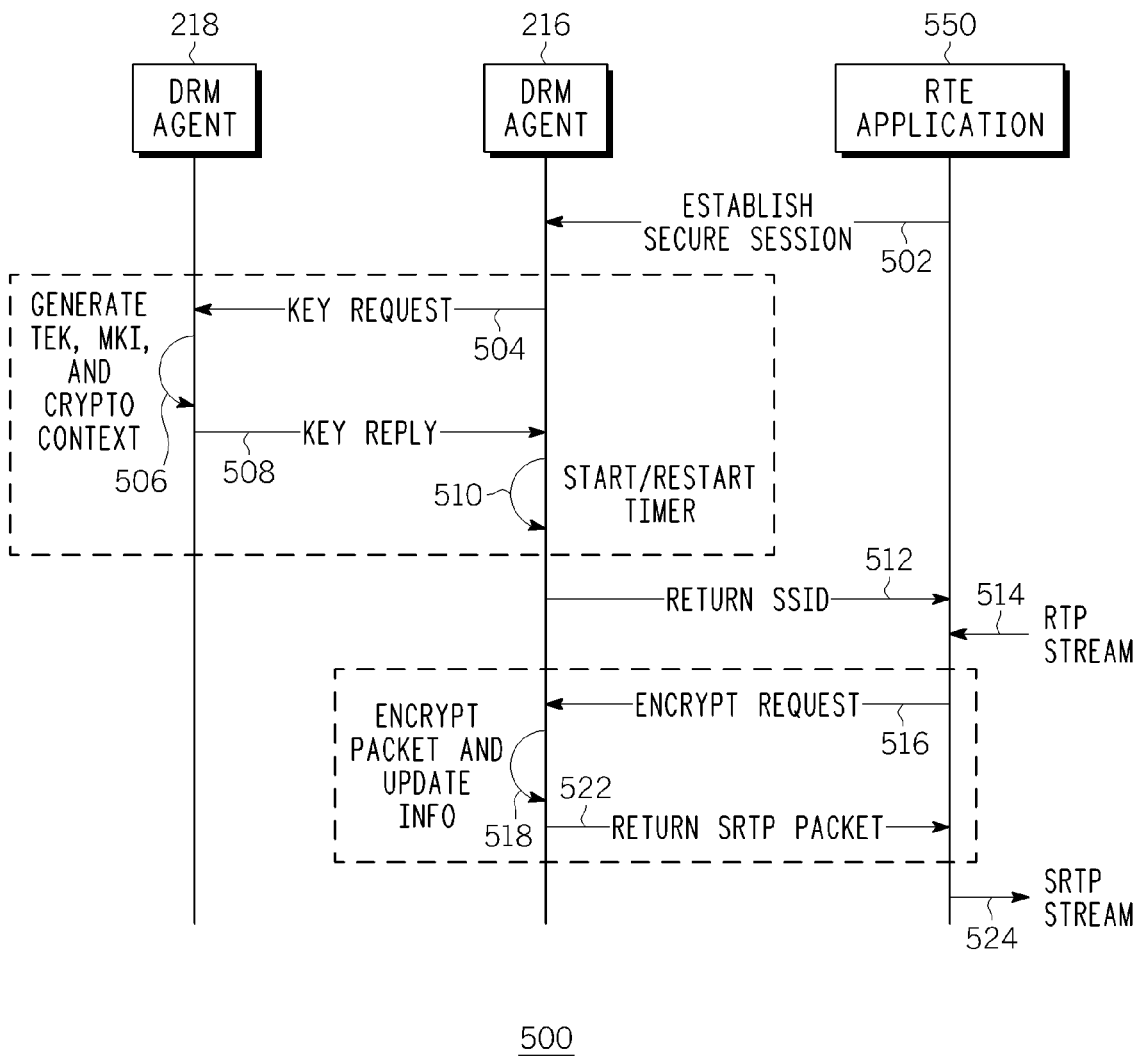
FIG. 5 is a flow diagram depicting an exemplary embodiment of a message sequence between a real-time encryptor (RTE) and an entitlement control message (ECM) generator in accordance with one or more aspects of the invention.

FIG. 5 is a flow diagram depicting an exemplary embodiment of a message sequence 500 between the RTE 204 and the ECM generator 206 in accordance with one or more aspects of the invention. The RTE 204 includes an RTE application 550. At step 502, the RTE application 550 invokes the DRM agent 216 to establish a secure session with the DRM agent 218 of the ECM generator 206. The DRM agent 216 will handle authentication and security for a key request/reply exchange. The RTE application 550 provides an information structure to the DRM agent 216 having stream-dependent parameters associated with an RTP stream. In one embodiment, the information structure includes the number of RTP sessions, a sequence number for each RTP session, a synchronization source identifier (SSRC) for each RTP session, and a rollover counter (ROC) for each RTP session. As is known in the art, an RTP stream may include one or more RTP sessions (e.g., a video session, and audio session, etc.).

At step 504, the DRM agent 216 sends a key request message to the DRM agent 218 of the ECM generator 206. The key request message includes the information structure described above, and may include other data, such as a key lifetime, an authenticate flag, and an identifier of the RTE 204. The key lifetime parameter allows the TEK to expire after a certain time. The authenticate flag indicates whether authentication tags are to be used in the SRTP packets. The DRM agent 216 appends authentication data to the key request message for use by the DRM agent 218.

At step 506, the DRM agent 218 generates a TEK and a master key identifier (MKI). The TEK is the SRTP master key. The DRM agent 218 constructs a cryptographic context that includes the TEK, the MKI, the information received in the key request message (e.g., the information structure, authentication flag, key lifetime, etc.), and a context ID. At step 508, the DRM agent 218 transmits a key reply message to the DRM agent 216. The DRM agent 218 may append authentication data to the key reply message. The key reply message includes the TEK and the MKI. At step 510, the DRM agent 216 starts or restarts a timer. The timer is used to determine when the TEK is expired. Steps 504, 506, 508, and 510 are repeated each time the TEK expires.

At step 512, the DRM agent 216 returns a secure session identifier (SSID) to the RTE application 550. At step 514, the RTE application 550 receives an RTP stream. At step 516, the RTE application 550 invokes the DRM agent 216 to encrypt an RTP packet. The RTE application 550 provides the SSID to the DRM agent 216 along with the packet. At step 518, the DRM agent 216 encrypts the RTP packet using the current TEK and updates the information structure (e.g., the sequence number, ROC, SSRC for each RTP session). At step 522, the DRM agent 216 sends an SRTP packet to the RTE application 550. Steps 516, 518, and 522 are repeated for each RTP packet in the RTP stream. At step 524, the RTE application 550 outputs an SRTP stream.

Figure 6:
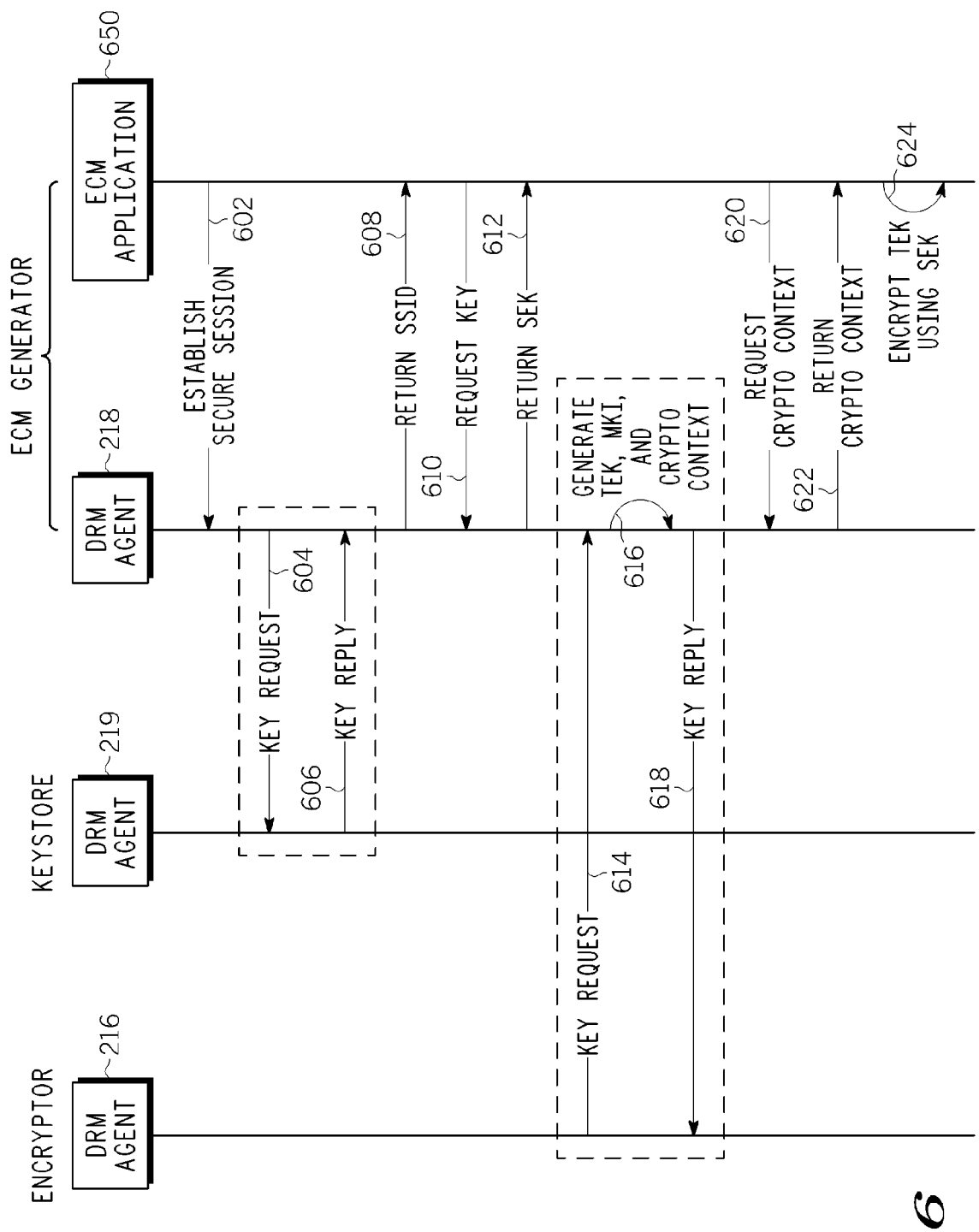
FIG. 6 is a flow diagram depicting an exemplary embodiment of a message sequence between an ECM generator, a key store, and an RTE in accordance with one or more aspects of the invention.

FIG. 6 is a flow diagram depicting an exemplary embodiment of a message sequence 600 between the ECM generator 206, the key store 212, and the RTE 204 in accordance with one or more aspects of the invention. The ECM generator 206 includes an ECM application 650. At step 602, the ECM application 650 invokes the DRM agent 218 to establish a secure session with the DRM agent 219 of the key store 212. At step 604, the DRM agent 218 sends a key request message to the DRM agent 219. The DRM agent 218 appends authentication data to the key request message. At step 606, the DRM agent 219 sends a key reply message to the DRM agent 218. The key reply message includes an SEK or a service subkey. The DRM agent 219 may append authentication data to the key reply message. Steps 604 and 606 are repeated each time the SEK or service subkey is expired.

At step 608, the DRM agent 218 sends an SSID associated with the SEK or service subkey to the ECM application 650. At step 610, the ECM application 650 sends a request for the SEK or subkey to the DRM agent 218. The ECM application 650 identifies the SEK or service subkey using the SSID. At step 612, the DRM agent 218 returns the SEK or service subkey to the ECM application 650. The ECM application 650 can request the SEK or service subkey from the DRM agent 218 whenever such key is required without concern for key lifetime. The validity of the SEK or service subkey is maintained by the DRM agent 218, which automatically keeps the SEK or service subkey current.

At step 614, the DRM agent 218 receives a key request message from the DRM agent 216 of the RTE 204. Such key request message is described above. At step 616, the DRM agent 218 generates a TEK and a master key identifier (MKI) along with a cryptographic context as described above in FIG. 5. At step 618, the DRM agent 218 sends a key reply message to the DRM agent 216 having the TEK and the MKI. Steps 614, 616, and 618 are repeated each time the TEK expires.

At step 620, the ECM application 650 sends a request for the cryptographic context to the DRM agent 218. The ECM application 650 includes a context ID the request. Using the context ID, at step 622, the DRM agent 218 retrieves and sends the appropriate cryptographic context to the ECM application 650. At step 624, the ECM application 650 encrypts at least the TEK within the cryptographic context using the SEK or an SEK derived from a service subkey and outputs an ECM stream.

While the foregoing is directed to illustrative embodiments of the present invention, other and further embodiments of the invention may be devised without departing from the basic scope thereof, and the scope thereof is determined by the claims that follow.

What is claimed is:

1. A method of synchronizing an encryptor and key management logic in a video distribution system, comprising:
   receiving an unencrypted content stream at a content playout of the video distribution system;
   receiving, at the key management logic from the encryptor, a request message requesting at least one encryption key for use by the encryptor in encrypting an Internet Protocol (IP) packet stream generated from the unencrypted content stream, the request message having authentication data and stream-dependent parameters associated with the IP packet stream to be encrypted, wherein the authentication data comprises an authentication token and a checksum value, the authentication token having an encrypted version of a session key and the checksum value being keyed with the session key;

verifying authenticity of the encryptor using the authentication data;

when the authenticity of the encryptor is verified, generating a cryptographic context for the IP packet stream, wherein the cryptographic context includes the stream-dependent parameters and the at least one encryption key;

sending a reply message to the encryptor, the reply message having the at least one encryption key; and distributing key stream messages having the cryptographic context by the key management logic to one or more user terminals, the one or more user terminals receiving a version of the IP packet stream as encrypted by the encryptor using the at least one encryption key, wherein the encrypted version of the IP packet stream is transmitted by a terrestrial television broadcast technology adapted for handheld broadcasts.

2. The method of claim 1, wherein the IP packet stream comprises a real-time transport protocol (RTP) stream and the encrypted version comprises a secure real-time transport protocol (SRTP) stream.

3. The method of claim 2, wherein the RTP stream includes at least one RTP session, and wherein the stream-dependent parameters for each of the at least one RTP session include at least one of: a roll-over counter (ROC) value, a sequence number, and a synchronization source.

4. The method of claim 3, wherein, each of the at least one encryption key is a master key and wherein each of the cryptographic context and the reply message further includes a master key identifier.

5. The method of claim 1, further comprising:
obtaining a service key from a key store;
wherein distributing the key stream messages having the cryptographic context to the one or more user terminals comprises encrypting at least a portion of the cryptographic context within the key stream messages using the service key, the at least a portion of the cryptographic context comprising the at least one encryption key.

6. The method of claim 1, wherein sending the reply message to the encryptor comprises encrypting at least a portion of the reply message, the at least a portion of the reply message comprising the at least one encryption key.

7. An apparatus for synchronizing an encryptor and key management logic in a video distribution system, the apparatus comprising:
means for receiving an unencrypted content stream;
means for receiving, from the encryptor, a request message requesting at least one encryption key for use by the encryptor in encrypting an Internet Protocol (IP) packet stream generated from the unencrypted content stream, the request message having authentication data and stream-dependent parameters associated with the IP packet stream to be encrypted, wherein the authentication data comprises an authentication token and a checksum value, the authentication token having an encrypted version of a session key and the checksum value being keyed with the session key;
means for verifying authenticity of the encryptor using the authentication data;
means for generating a cryptographic context for the IP packet stream, wherein the cryptographic context includes the stream-dependent parameters and the at least one encryption key, based on the authenticity of the encryptor being verified;
means for sending a reply message to the encryptor, the reply message having the at least one encryption key; and
means for distributing key stream messages having the cryptographic context to one or more user terminals, the one or more user terminals receiving a version of the IP packet stream as encrypted by the encryptor using the at least one encryption key, wherein the encrypted version of the IP packet stream is transmitted by a terrestrial television broadcast technology adapted for handheld broadcasts.

8. The apparatus of claim 7, wherein the IP packet stream comprises a real-time transport protocol (RTP) stream and the encrypted version comprises a secure real-time transport protocol (SRTP) stream.

9. The apparatus of claim 8, wherein the RTP stream includes at least one RTP session, and wherein the stream-dependent parameters for each of the at least one RTP session include at least one of: a roll-over counter (ROC) value, a sequence number, and a synchronization source.

10. The apparatus of claim 9, wherein each of the at least one encryption key is a master key and wherein each of the cryptographic context and the reply message further includes a master key identifier.

11. The apparatus of claim 7, further comprising:
means for obtaining a service key from a key store;
wherein the means for distributing comprises means for encrypting at least a portion of the cryptographic context within the key stream messages using the service key, the at least a portion of the cryptographic context comprising the at least one encryption key.

12. The apparatus of claim 7, wherein the means for sending the reply message comprises means for encrypting at least a portion of the reply message, the at least a portion of the reply message comprising the at least one encryption key.

13. A video distribution system, comprising:
an encryptor component for encrypting configured to encrypt an internet protocol (IP) packet stream generated from an unencrypted content stream using at least one encryption key; and
an entitlement control message (ECM) generator component in communication with the encryptor component, the ECM generator component configured to:
receive a request message from the encryptor component requesting the at least one encryption key for use by the encryptor component in encrypting the IP packet stream generated from the unencrypted content stream, the request message having authentication data and stream-dependent parameters associated with the IP packet stream, wherein the authentication data comprises an authentication token and a checksum value, the authentication token having an encrypted version of a session key and the checksum value being keyed with the session key,
verify authenticity of the encryptor component using the authentication data,
when the authenticity of the encryptor component is verified, generate a cryptographic context for the IP packet stream, wherein the cryptographic context includes the stream-dependent parameters and the least one encryption key,
send a reply message to the encryptor component, the reply message having the at least one encryption key, and distribute key stream messages having the cryptographic context to one or more user terminals, the one or more user terminals receiving a version of the IP packet stream as encrypted by the encryptor using the at least one encryption key, wherein the encrypted version of the IP packet stream is transmitted by a terrestrial television broadcast technology adapted for handheld broadcasts.

14. The system of claim 13, further comprising:
a key store;
wherein the ECM generator component is further configured to obtain a service key from the key store and encrypt at least a portion of the cryptographic context within the key stream messages using the service key, the at least a portion of the cryptographic context comprising the at least one encryption key.

15. The system of claim 14, further comprising:
a rights issuer component configured to obtain the service key from the key store and distribute entitlement management messages (EMMs) having an encrypted version of the service key to the one or more user terminals.

16. The system of claim 13, further comprising:
a key distribution center (KDC);
wherein the encryptor component is configured to obtain the authentication token from the KDC.

17. The system of claim 13, wherein the IP packet stream comprises a real-time transport protocol (RTP) stream and the encrypted version comprises a secure real-time transport protocol (SRTP) stream.

* * * * *